United States Patent
Usoro

(10) Patent No.: US 7,954,580 B2
(45) Date of Patent: Jun. 7, 2011

(54) ACCESSORY DRIVE SYSTEM AND METHOD FOR A BELT-ALTERNATOR-STARTER ELECTRIC HYBRID VEHICLE

(75) Inventor: Patrick B. Usoro, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 11/372,909

(22) Filed: Mar. 10, 2006

(65) Prior Publication Data

US 2007/0213151 A1    Sep. 13, 2007

(51) Int. Cl.
*B60K 6/20* (2007.10)
*B60K 6/42* (2007.10)
*B60W 20/00* (2006.01)
*F16H 7/00* (2006.01)

(52) U.S. Cl. .............. 180/65.275; 180/65.21; 180/65.22; 474/87

(58) Field of Classification Search ................ 474/5, 87; 475/5; 180/65.3, 65.21, 65.22, 65.275; 477/167, 477/174

See application file for complete search history.

(56) References Cited

U.S. PATENT DOCUMENTS

| 5,249,637 | A | * | 10/1993 | Heidl et al. ................. 180/65.2 |
| 5,993,351 | A | * | 11/1999 | Deguchi et al. .................. 477/5 |
| 6,702,053 | B2 | * | 3/2004 | Nogi et al. .................. 180/65.2 |
| 6,863,139 | B2 | * | 3/2005 | Egami et al. ................ 180/53.8 |
| 2003/0104900 | A1 | * | 6/2003 | Takahashi et al. ................. 477/3 |
| 2004/0030470 | A1 | * | 2/2004 | De La Salle et al. ........... 701/22 |
| 2005/0107198 | A1 | * | 5/2005 | Sowul et al. ..................... 475/5 |

* cited by examiner

*Primary Examiner* — Michael R Mansen
*Assistant Examiner* — Robert T Reese
(74) *Attorney, Agent, or Firm* — Quinn Law Group, PLLC

(57) ABSTRACT

The method and apparatus of the present invention provide an accessory drive system for a belt-alternator-starter electric hybrid vehicle. The apparatus includes a drive pulley connected to an engine output shaft, a plurality of accessories that are each connected to a driven pulley, and a selectively engageable torque transmitting device disposed between the engine crankshaft and a transmission. A belt-alternator-starter system is connected to another driven pulley. A drive belt connectively couples the drive pulley and the driven pulleys and is operable to transfer drive forces between the drive pulley and the driven pulleys. A controller is operatively connected to the torque transmitting device, the engine and the belt-alternator-starter system. The controller is configured to control the torque transmitting device, the engine and the belt-alternator-starter system to ensure the accessories are adequately powered.

18 Claims, 1 Drawing Sheet

ACCESSORY DRIVE SYSTEM AND METHOD FOR A BELT-ALTERNATOR-STARTER ELECTRIC HYBRID VEHICLE

TECHNICAL FIELD

The present invention pertains generally to a method and apparatus for driving accessories on an electric hybrid vehicle having a belt-alternator-starter (BAS) system.

BACKGROUND OF THE INVENTION

The accessories in a conventional motor vehicle are powered by output from the engine. An electric hybrid vehicle generally includes both an internal combustion engine and one or more electric motor/generators. Some of the accessories in a hybrid vehicle may require power while the engine is off and the vehicle is being powered by the electric motor/generator. Traditionally, in order to power hybrid vehicle accessories when the engine is off, it was necessary to provide each such accessory with a separate electric motor.

The typical automotive accessory drive system consists of a drive pulley connected to an output shaft of the engine, typically the crankshaft. Wrapped around this pulley is a flexible drive belt, which in turn is wrapped around a plurality of driven pulleys. This flexible drive belt transmits drive forces between the drive pulley and the driven pulleys. The driven pulleys may be fixably attached to accessories known in the art such as a power steering pump, air conditioning compressor, alternator, and water pump.

A belt-alternator-starter (BAS) system employs a combined starter and alternator motor/generator mounted with respect to the other components of the accessory drive system. This system combines the alternator and starter motor/generator into one device that can be mounted in effectively the same way and in effectively the same packaging space as a traditional alternator.

SUMMARY OF THE INVENTION

The method and apparatus of the present invention provide an accessory drive system for a belt-alternator-starter electric hybrid vehicle. The apparatus includes a torque transmitting device selectively connecting an engine with a transmission. A drive pulley is connected to an engine crankshaft. A plurality of driven pulleys are each connected to one of a plurality of accessories. A belt-alternator-starter system is connected to another driven pulley. A drive belt connectively couples the drive pulley and the driven pulleys and is operable to transfer drive forces between the drive pulley and the driven pulleys. A controller is operatively connected to the torque transmitting device, the engine and the belt-alternator-starter system. The controller is configured to control the torque transmitting device, the engine and the belt-alternator-starter system to ensure the accessories are adequately powered.

The method of the present invention allows the accessories to be driven by power from the engine or the belt-alternator-starter system under all vehicle operating conditions without the need for individual accessory electric drive motors, as is often practiced, by requiring that the hybrid powertrain be operated to maintain a minimum input (engine) speed even when fuel to the engine is shut off and/or the vehicle is stopped. Energy is transferred either from the engine or the belt-alternator-starter system to the plurality of accessories. The engine, belt-alternator-starter system, and torque transmitting device are controlled, such as with an electronic controller, to ensure each of the accessories receive enough energy to remain fully operational.

According to one aspect of the invention, the apparatus includes a storage device such as a battery operatively connected to the belt-alternator-starter system, the storage device being configured to store energy from the belt-alternator-starter system when excess power is being produced by the engine or power is being recuperated from braking.

According to another aspect of the invention, the hybrid powertrain is controlled to ensure that the input speed (therefore the engine crankshaft speed and accessory drive pulley speed) is not operated below the predefined minimum engine speed when the vehicle is in operation, including when fuel is cut off to the engine to reduce fuel consumption.

According to yet another aspect of the invention, for engines equipped with variable valve actuation, the method includes appropriately manipulating the intake and exhaust valves (for example, keeping both intake and exhaust valves closed) when fuel to the engine is shut off and the accessories are being driven by power from the belt-alternator-starter system, in order to reduce rotational resistance and pumping losses, and so improve the efficiency of the accessory drive system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
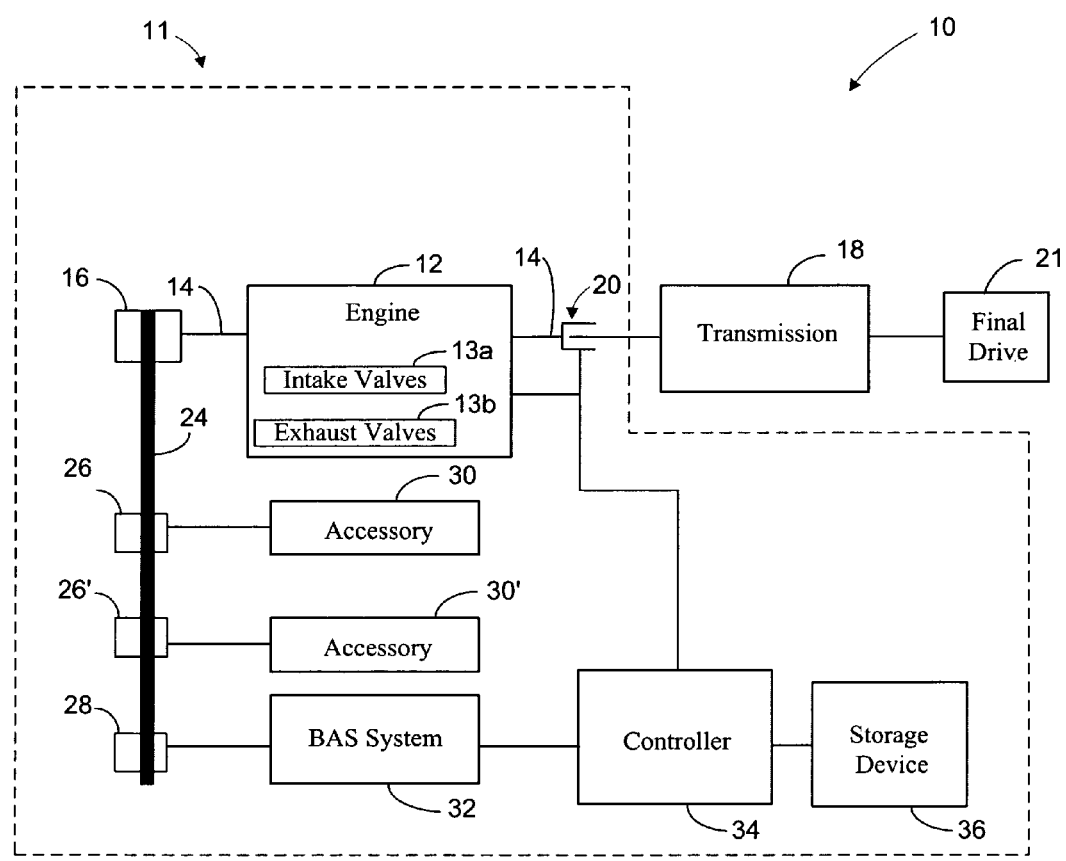
FIG. 1 is a schematic diagram of an electric hybrid vehicle having an accessory drive system in accordance with the present invention.

Referring to the drawings, wherein like reference numbers refer to like components, FIG. 1 shows a schematic representation of an electric hybrid powertrain 10 having an accessory drive system 11. The accessory drive system 11 includes an engine 12 configured to transmit output to a drive pulley 16 and/or to a transmission 18. The drive pulley 16 is operatively connected to the engine 12 via a crankshaft or output shaft 14. The engine 12 is connected to and controlled by a controller such as the controller 34. The controller 34 may be configured to include a hybrid control module, engine control module, transmission control module, motor/generator control modules and necessary electronic drives or power electronics circuits.

A selectively engageable torque transmitting device such as the clutch 20 is disposed between the engine 12 and the transmission 18. The clutch 20 is operatively connected to and controlled by the controller 34. The clutch 20 is configured to operatively couple or de-couple the engine crankshaft 14 from the transmission 18 such that power is selectively transferable therebetween. More precisely, when the clutch 20 is engaged torque and power are transferable from the engine crankshaft 14 through the transmission 18 to drive or power the hybrid vehicle by means of a final drive 21. Conversely, when the clutch 20 is disengaged, torque and power from the engine crankshaft 14 are not transferred to the transmission 18.

The drive pulley 16 is operatively connected via a drive belt 24 to a plurality of driven pulleys 26, 26' and to a driven pulley 28. Each of the driven pulleys 26, 26' are operatively connected to one of a plurality of accessories 30, 30', respectively. The driven pulley 28 is operatively connected to a belt-alternator-starter (BAS) system 32. The accessories 30, 30' may include, for example, a power steering pump, a water pump, or an air conditioning compressor. The BAS system 32 preferably includes a combined alternator and starter motor/generator (not shown), and is operatively connected to the controller 34 and a storage device 36. The storage device 36 is adapted to store energy from the BAS system 32 when the engine 12 is producing excess power or when vehicle braking power is being recuperated. According to a preferred embodiment, the storage device 36 is a battery; however, alternate storage devices may be envisioned.

Power from the engine 12 is transferable through the crankshaft 14, through the drive pulley 16, and through the drive belt 24 to power the accessories 30, 30' and the BAS system 32. Power transferred to the BAS system 32 is convertible from the rotational motion of the drive belt 24 to electric energy by the alternator portion of the BAS system 32, and this electric energy can be stored in the storage device 36. Additionally, the BAS system 32 is operable to transmit power through the driven pulley 28, through the drive belt 24, and through the driven pulleys 26, 26' to power the accessories 30, 30'. In order to power the accessories of a hybrid vehicle when the engine is off, it was conventionally necessary to provide a separate electric motor for each such accessory. Therefore, by controlling the BAS system 32 to power all of the accessories 30, 30' when the engine 12 is off, the present invention saves the cost associated with manufacturing and installing the plurality of electric motors otherwise required to power the accessories 30, 30'.

The accessories 30, 30' must each be driven above a predefined minimum speed in order to remain fully operational. Therefore, according to a preferred embodiment, the present invention establishes a predetermined minimum engine speed $V_m$ calculated to ensure the accessories 30, 30' are adequately powered. For purposes of the present invention, the accessories 30, 30' are "adequately powered" when they receive enough power to remain fully operational, and "engine speed" is defined as the rotational speed of the crankshaft 14 measured using a conventional speed sensor (not shown) attached thereto. It should be appreciated that while engine speed is preferably monitored and controlled to ensure the accessories 30, 30' are adequately powered, alternate embodiments may monitor and control other characteristics of the accessory drive system 11 such as, for example, the rotational speed of one or more of the pulleys 16, 26, 26', 28, and/or the drive belt 24.

Under operating conditions wherein the engine 12 is fueled and running normally, the accessories 30 and 30' are driven by power from the engine 12, just as in conventional vehicles.

Under operating conditions that normally call for the engine 12 of the hybrid electric vehicle to be shut down, the controller 34 shuts off the transfer of fuel to the engine 12 and the BAS system 32 is operated to power the accessories 30, 30'. More precisely, after the transfer of fuel is shut off, the controller 34 commands the BAS system 32 to transmit power through the driven pulley 28, through the drive belt 24, through the pulleys 26, 26', and to the accessories 30, 30'. As the BAS system 32 transfers power to the accessories 30, 30' via the drive belt 24, the driving pulley 16 and the crankshaft 14 attached thereto are also necessarily being driven. For engines equipped with variable valve actuation, the controller 34 can appropriately manipulate the intake valves 13a and exhaust valves 13b (for example, but not limited to, keeping both the intake valves 13a and the exhaust valves 13b closed) when fuel to the engine 12 is shut off and the accessories 30, 30' are being driven by power from the BAS system 32, in order to reduce crankshaft rotational resistance and engine pumping losses, and thereby improve the efficiency of the accessory drive system 11.

If the engine 12 is shut down and the vehicle is decelerating to a stop, the clutch 20 can be disengaged to de-couple the engine 12 from the transmission 18. Thereafter, the controller 34 can command the BAS system 32 to transfer additional power to maintain the engine crankshaft speed above the predetermined minimum value $V_m$ such that the accessories 30, 30' remain fully operational and without affecting vehicle performance. If, however, the vehicle is being powered by the BAS system 32, the clutch 20 must be suitably controlled by the controller 34 to be fully or partially engaged, and the BAS system 32 is controlled by the controller 34 to provide adequate power to run the accessories as well as meet driver demands pertaining to vehicle output. In other words, the accessories 30, 30' are powered to remain fully operational without sacrificing vehicle output demands such as, for example, vehicle speed and acceleration demands.

A method for driving the electronic accessories on a hybrid electric vehicle having a belt-alternator-starter (BAS) system includes the following. Energy from the engine 12 and/or the BAS system 32 is transferred to the accessories 30, 30' via the drive belt 24. As energy is transferred to the accessories 30, 30', the engine 12 and/or the BAS system 32 are controlled by the controller 34 to ensure the engine speed exceeds the predetermined minimum value $V_m$ and the accessories 30, 30' remain fully operational. This may be accomplished, for example, by increasing the output of the engine 12 and/or the BAS system 32 as required to adequately power the accessories 30, 30' while meeting driver desires.

While the best modes for carrying out the invention have been described in detail, those familiar with the art to which this invention relates will recognize various alternative designs and embodiments for practicing the invention within the scope of the appended claims.

The invention claimed is:

1. An accessory drive system for a hybrid electric vehicle comprising:
    an engine having an engine crankshaft operatively connectable to a transmission, the engine providing power to a vehicle drive member through the transmission when the engine is running;
    a selectively engageable torque transmitting device operatively connected between the engine crankshaft and the transmission;
    a drive pulley continuously connected to the engine crankshaft for common rotation;
    an accessory operatively connected to one of a plurality of driven pulleys;
    a belt-alternator-starter system operatively connected to another of said plurality of driven pulleys;
    a flexible drive belt operatively connecting said drive pulley and said plurality of driven pulleys and operable to transfer drive forces between said drive pulley and said plurality of driven pulleys;
    wherein the belt-alternator-starter system, the engine crankshaft and the accessory are continuously and directly connected via the drive belt;
    a controller operatively connected to the torque transmitting device, the engine and the belt-alternator-starter system;
    wherein said controller is configured to control the engine to power the accessory when the engine is running;
    wherein said controller is configured to control the belt-alternator-starter system to operate at a predefined speed to ensure that the accessory is adequately powered by the belt-alternator-starter system when the engine is not running and the engine speed is below a predefined value; and wherein the torque transmitting device is disengaged by the controller when the belt-alternator-starter system is powering the accessory.

2. The accessory drive system of claim 1, wherein the engine includes a plurality of intake valves and a plurality of exhaust valves.

3. The accessory drive system of claim 2, wherein the controller is configurable to manipulate the intake valves and the exhaust valves when the accessory is being driven by power from the belt-alternator-starter system, in order to reduce crankshaft rotational resistance and engine pumping losses, and thereby improve the efficiency of the accessory drive system.

4. The accessory drive system of claim 1, further comprising a storage device operatively connected to the belt-alternator-starter system, said storage device being configured to store energy from the belt-alternator-starter system when the engine is producing excess power or when braking power is being recuperated.

5. The accessory drive system of claim 4, wherein the storage device is a battery.

6. The accessory drive system of claim 5, wherein the selectively engageable torque transmitting device is a clutch.

7. The accessory drive system of claim 6, wherein the clutch is controllable to transfer enough energy to ensure the accessory is adequately powered without sacrificing driver demands pertaining to vehicle output.

8. The accessory drive system of claim 1, wherein the accessory drive system is characterized by the absence of a gear operatively connected between the belt-alternator starter system and said engine.

9. An automotive accessory drive system for a belt-alternator-starter electric hybrid vehicle comprising:

an engine having an engine crankshaft operatively connectable to a transmission, the engine providing power to a vehicle drive member through the transmission when the engine is running;

a selectively engageable torque transmitting device operatively connected between the engine crankshaft and the transmission;

a drive pulley continuously connected to the engine crankshaft for common rotation;

a plurality of accessories each of which is operatively connected to a respective one of a plurality of driven pulleys;

a belt-alternator-starter system operatively connected to a different respective one of said plurality of driven pulleys;

wherein the accessory drive system is characterized by the absence of any gear operatively connected between said belt-alternator-starter system and said engine;

a storage device operatively connected to the belt-alternator-starter system, said storage device being configured to store energy from the belt-alternator-starter system when the engine is producing excess power or when braking power is being recuperated;

a flexible drive belt operatively connecting said drive pulley and said plurality of driven pulleys and operable to transfer drive forces between said drive pulley and said plurality of driven pulleys;

wherein the belt-alternator-starter system, the engine crankshaft and the accessory are continuously and directly connected via the drive belt;

a controller operatively connected to the torque transmitting device, the engine and the belt-alternator-starter system;

wherein said controller is configured to control the engine to power the plurality of accessories when the engine is running;

wherein said controller is configured to control the belt-alternator-starter system to operate at a predefined speed to ensure that said plurality of accessories are adequately powered by the belt-alternator-starter system when the engine is not running and the engine speed is below a predefined value; and wherein the torque transmitting device is disengaged by the controller when the belt-alternator-starter system is powering the accessory.

10. The accessory drive system of claim 9, wherein the engine includes a plurality of intake valves and a plurality of exhaust valves.

11. The accessory drive system of claim 10, wherein the controller is configurable to manipulate the intake valves and the exhaust valves when the accessories are being driven by power from the belt-alternator-starter system, in order to reduce crankshaft rotational resistance and engine pumping losses, and thereby improve the efficiency of the accessory drive system.

12. The accessory drive system of claim 11, wherein the storage device is a battery.

13. The accessory drive system of claim 12, wherein the selectively engageable torque transmitting device is a clutch.

14. The accessory drive system of claim 13, wherein the clutch is controllable to transfer enough energy to ensure the accessories are adequately powered without sacrificing driver demands pertaining to vehicle output.

15. A method for operating an accessory drive system of a belt-alternator-starter electric hybrid vehicle comprising:

providing an engine having a crankshaft operatively connectable to a transmission, the engine providing power to a vehicle drive member through the transmission when the engine is running;

providing a belt-alternator starter system operatively connectable to the engine;

providing a selectively engageable torque transmitting device operatively connected between the engine crankshaft and the transmission;

providing a drive pulley continuously connected to the engine crankshaft for common rotation, wherein the drive pulley is operatively connectable with the belt-alternator starter system;

transferring energy from one of the engine and the belt-alternator starter system to a plurality of accessories, each of the plurality of accessories being operatively connected to a respective one of a plurality of driven pulleys;

providing a flexible drive belt operatively connecting said pulled said plurality of driven pulleys;

wherein the belt-alternator-starter system, the engine crankshaft and the accessory are continuously and directly connected via the drive belt;

establishing a predefined minimum speed at which all of said plurality of accessories must be driven in order to remain fully operational; and controlling the torque transmitting device and the transfer of energy from the engine and the belt-alternator starter system to ensure that the speed at which the accessories are driven does not fall below the predefined minimum speed.

16. The method of claim 15, further comprising manipulating a plurality of intake valves and exhaust valves of the engine when the accessories are being driven by power from the belt-alternator starter system, in order to reduce crankshaft rotational resistance and engine pumping losses, and thereby improve the efficiency of the accessory drive system.

17. The method of claim 15, further comprising controlling the selectively engageable torque transmitting device to transfer enough energy to ensure the accessories are adequately powered without sacrificing driver demands pertaining to vehicle output.

18. The method of claim 15, further comprising storing energy from the belt-alternator starter system in a battery when excess power is being produced by the engine or when braking power is being recuperated.

* * * * *